(12) United States Patent
Kawale et al.

(10) Patent No.: US 11,421,779 B2
(45) Date of Patent: Aug. 23, 2022

(54) PREDICTIVE TRANSMISSION SHIFTING

(71) Applicant: Eaton Cummins Automated Transmission Technologies, LLC, Galesburgh, MI (US)

(72) Inventors: Sujay Kawale, Sedro-Wooley, WA (US); Eric R. Von Hoene, Galesburg, MI (US); Justin Keith Griffiths, Clarkston, MI (US); Cory Snowdin, Mason, MI (US); Terry Nostrant, Marshall, MI (US); Nicholas Jelen, Portage, MI (US)

(73) Assignee: EATON CUMMINS AUTOMATED TRANSMISSION TECHNOLOGIES, LLC, Galesburg, MI (US)

( * ) Notice: Subject to any disclaimer, the term of this patent is extended or adjusted under 35 U.S.C. 154(b) by 61 days.

(21) Appl. No.: 16/940,550

(22) Filed: Jul. 28, 2020

(65) Prior Publication Data
US 2021/0054926 A1    Feb. 25, 2021

Related U.S. Application Data

(60) Provisional application No. 62/889,893, filed on Aug. 21, 2019.

(51) Int. Cl.
*F16H 61/02* (2006.01)
*F16H 59/66* (2006.01)

(52) U.S. Cl.
CPC ......... *F16H 61/0213* (2013.01); *F16H 59/66* (2013.01); *F16H 2059/663* (2013.01); *F16H 2061/022* (2013.01); *F16H 2061/0234* (2013.01)

(58) Field of Classification Search
CPC .... F16H 59/44; F16H 59/66; F16H 2059/663; F16H 2059/666; F16H 61/0213; F16H 61/16; F16H 2061/022; F16H 2061/0234
See application file for complete search history.

(56) References Cited

U.S. PATENT DOCUMENTS

| | | | | |
|---|---|---|---|---|
| 5,241,476 A * | 8/1993 | Benford | ............... | F16H 61/0213 477/120 |
| 5,479,345 A * | 12/1995 | Amsallen | ............ | F16H 61/0213 701/59 |
| 5,832,400 A * | 11/1998 | Takahashi | ............. | B60W 30/18 701/53 |
| 10,400,888 B2 * | 9/2019 | Jerger | ..................... | F16H 59/66 |
| 10,975,958 B1 * | 4/2021 | Ooshima | ................. | F16H 59/36 |
| 10,975,961 B2 * | 4/2021 | Ooshima | ................. | F16H 61/16 |
| 2012/0271524 A1 * | 10/2012 | Eriksson | ................ | B60W 10/11 701/93 |
| 2013/0211695 A1 * | 8/2013 | Bjernetun | ......... | B60W 50/0097 701/110 |

(Continued)

*Primary Examiner* — Edwin A Young
(74) *Attorney, Agent, or Firm* — James J. Pingor

(57) ABSTRACT

A vehicle transmission can perform predictive shifting. Road grade and vehicle path data can be employed to identify a future change in road grade such as a hill. A change in speed relative to a vehicle cruise speed can be estimated or predicted in view of the change in road grade and a current gear. If the change of speed is determined to be outside a performance bound, shift recommendation can be determined to maintain vehicle cruise speed within the performance bound. A controller can alter default gear selection of the transmission in response to receipt of the shift recommendation.

20 Claims, 12 Drawing Sheets

(56) References Cited

U.S. PATENT DOCUMENTS

2015/0362065 A1* 12/2015 Johansson ............... F16H 59/36
                                                           701/65
2020/0156618 A1*  5/2020 Kook ..................... B60W 10/11

* cited by examiner

PREDICTIVE TRANSMISSION SHIFTING

CROSS-REFERENCE TO RELATED APPLICATIONS

This application claims the benefit of U.S. Provisional Application No. 62/889,893, filed Aug. 21, 2019, and entitled "PREDICTIVE SHIFTING OF AUTOMATED TRANSMISSION," the entirety of which is incorporated herein by reference.

BACKGROUND

A transmission is a mechanical device that adapts power from an engine to drive wheels of a motor vehicle. Gears of a transmission can control engine output to provide needed torque and power, such that the greatest torque is provided when a vehicle is at rest and moving slowly and maximum power is provided at high speed. Gears can be shifted or changed to achieve a desired speed.

There are several types of transmissions including manual, automatic, and automated. A manual transmission enables gears to be changed by manual operation of a clutch and shifter by a driver. Here, the clutch engages and disengages a transmission to allow shifting of the transmission into a different gear by the driver using the shifter. An automatic transmission replaces the manual clutch and shifter with a torque converter that automatically engages and disengages gears in a planetary gear set. An automated transmission, or automated manual transmission, uses a manual gearbox with a clutch and gearshifts performed automatically by way of an electronic controller or computer. The different transmissions have various tradeoffs.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to predictive transmission shifting. Road grade data can be received and utilize to detect future changes in road grade such as hills in a path of a vehicle. Predictions can be made regarding at least change of vehicle speed on the future road grade. In one instance, predicted speed relative to a current speed can be analyzed with respect to a performance threshold. When the predicted speed is outside a performance threshold, a shift recommendation is determined to maintain vehicle speed within the performance threshold. The shift recommendation can subsequently be communicated to a controller that modifies gear selection based on the shift recommendation. In some instances, the shift recommendation can trigger a change of gear, such as a downshift in advance of an uphill section. In other instances, the shift recommendation can prevent a change of gear, for example preventing a downshift near the top of a hill.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

As opposed to manual transmissions that require a driver manually shift gears, automatic and automated transmissions execute gearshifts without driver intervention. Such transmissions can select a gear and automatically transition between gears based on speed and acceleration demanded as indicated by position of an accelerator pedal. In the context of cruise control in which maximum speed is set, the cruise control system can adjust the acceleration to maintain speed and the transmission gearshifts merely respond to speed and acceleration demand.

Details provided herein generally pertain to predictive transmission shifting. Future road grade data can be collected based on current vehicle location and path to identify changes in road grade. The existence and extent of uphill and downhill sections can be determined based on the road grade data. Vehicle status on future road grade sections can be classified in terms of whether speed loss or gain relative to a desired speed is within or outside a performance threshold. If the predicted speed is outside the performance threshold a shift recommendation can be determined to ensure the predicted speed is within the performance threshold. The shift recommendation can be communicated to a transmission controller to alter gear selection based on the shift recommendation. The shift recommendation can be determined based on a myriad of factors including, among others, road grade, location with respect to the road grade, and current speed and gear. In one instance, the shift recommendation can trigger a change of gear. In another instance, the shift recommendation can inhibit a gear change.

Predictive shifting can be designed to enhance shift decisions in various scenarios. For example, a downshift can be triggered in advance of an uphill section or in anticipation of retarder demand when over speeding on a downhill section. In another instance, a downshift can be prevented as the vehicle nears the top of a hill and a speed drop can be allowed on an uphill section. Enhanced shift decisions that consider future road grade and predicted performance can result in improved drivability as well as fuel economy.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
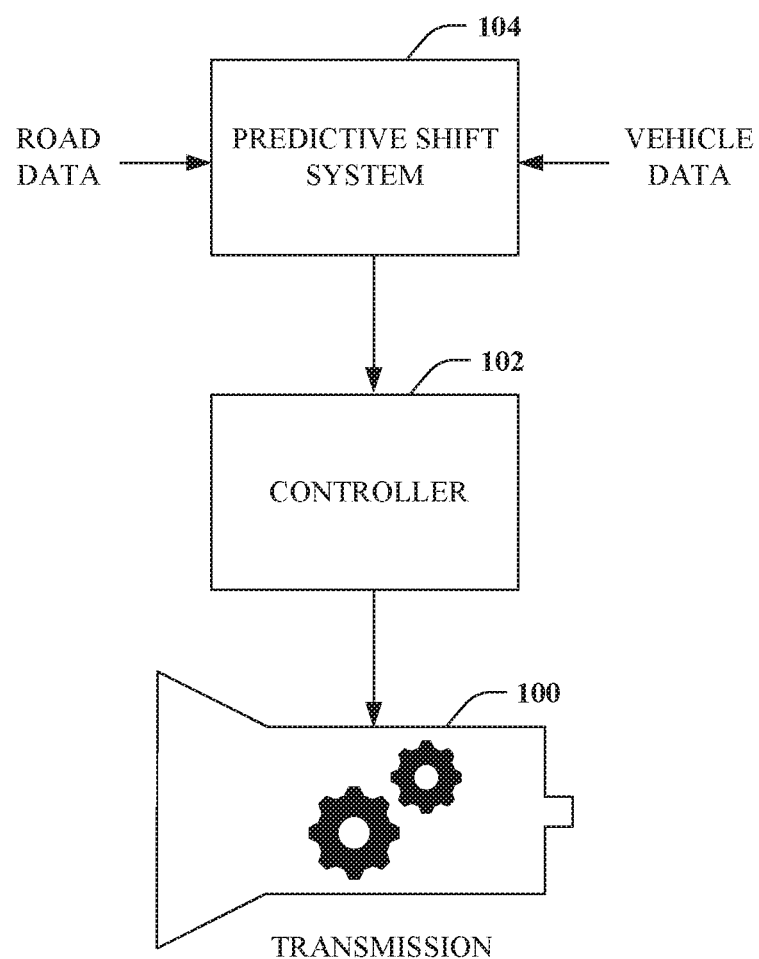
FIG. 1 illustrates an overview of an example implementation.

Referring initially to FIG. 1, a high-level overview of an example implementation is illustrated and described hereinafter. As depicted, the example implementation includes transmission 100, controller 102, and predictive shift system 104. The predictive shift system 104 communicates with the controller 102, which interacts with the transmission 100.

The transmission 100 is a mechanical device including gears that can control engine output to provide torque and power to wheels of a vehicle. The gears can be shifted or changed to achieve a desired vehicle speed. The transmission 100 corresponds to an automated, automatic, or hybrid type transmission that is capable of shifting gears without manual driver intervention.

The controller 102 is an electronic or computing device associated with the transmission 100. The controller is configured to select and automatically trigger shifting of gears in the transmission 100. The controller can employ data from a plurality of sensors to determine when and how to shift gears. For example, such data can correspond to vehicle speed and position of an accelerator or throttle pedal.

The predictive shift system 104 can provide shift recommendations or instructions that cause the controller 102 to trigger or prevent a gear shift. More specifically, the predictive shift system 104 can acquire future road grade data as well as vehicle data such as speed and location, to improve shift decisions of the controller 102 improving drivability, fuel economy, or both. The predictive shift system 104 can collect road grade data and utilize the data to determine the existence and severity of a hill in the path of a vehicle. Further, the predictive shift system 104 can determine the position of a hill in the future road grade relative to current vehicle position. Vehicle speed can then be predicted based on the future road grade. In one instance, vehicle status on the future road grade can be classified based on whether speed is lost or gained relative to a desired cruise speed as compared to a performance bound in a current gear of the transmission 100. If the vehicle status is determined to be out of bounds, a decision can be made, based on predicted vehicle status and vehicle position relative to the future road grade, to trigger a gearshift or inhibit a gearshift. For instance, a downshift can be triggered in advance of an uphill section or in anticipation of retarder demand when over speeding on a downhill section. In another instance, a downshift can be inhibited near the top of a hill.

The predictive shift system 104 and the controller 102 are depicted separately in FIG. 1. This represents one embodiment and is intended to highlight distinctive features of the predictive shift system 104 from conventional shifting performed by the controller 102. It is to be appreciated that the predictive shift system 104 can be embodied within the controller 102 in another embodiment. Further, the controller 102 can be embodied within or on the transmission 100 as opposed to separate from the transmission 100.

Figure 2:
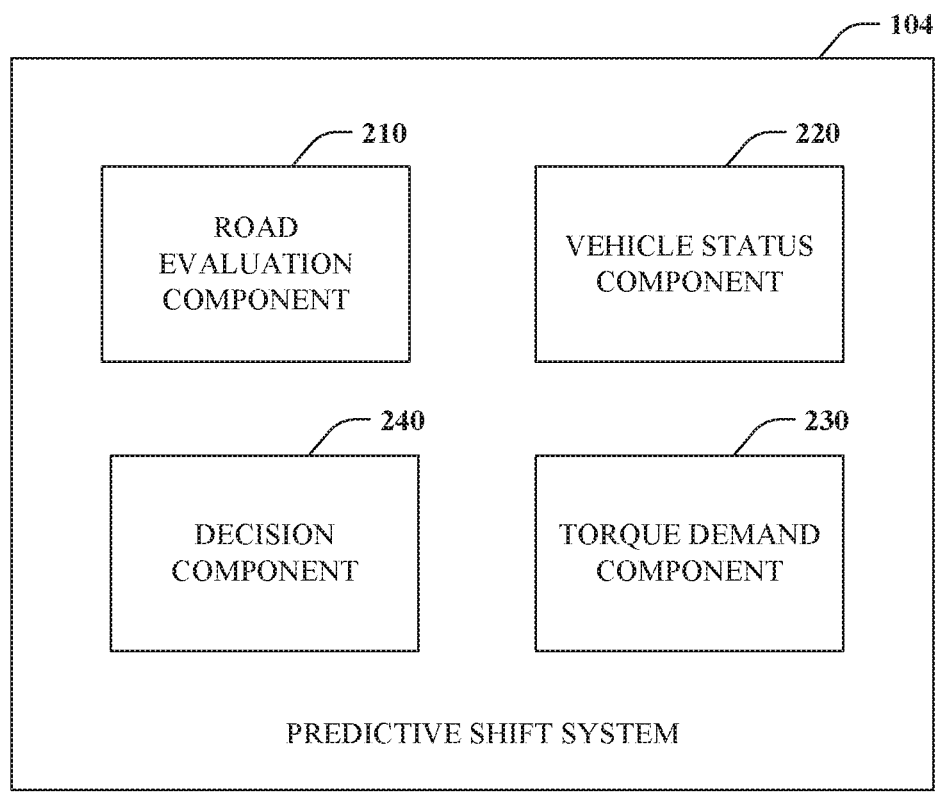
FIG. 2 is a schematic block diagram of an example predictive shift system.

FIG. 2 is a schematic block diagram of an example predictive shift system 104. The predictive shift system includes road evaluation component 210, vehicle status component 220, torque demand component 230, and decision component 240. In one embodiment, the road evaluation component 210, vehicle status component 220, torque demand component 230, and decision component 240 are computer executable components that when executed by a computer cause the computer to implement functionality of the predictive shift system 104 as described herein.

The road evaluation component 210 is configured to receive, retrieve, or otherwise obtain or acquire future road grade data or information and determine existence and severity of uphill and downhill sections of road. The road grade data can be acquired from substantially any number of sources including, among others, vehicle sensors, global positioning, and elevation maps.

Figure 3:
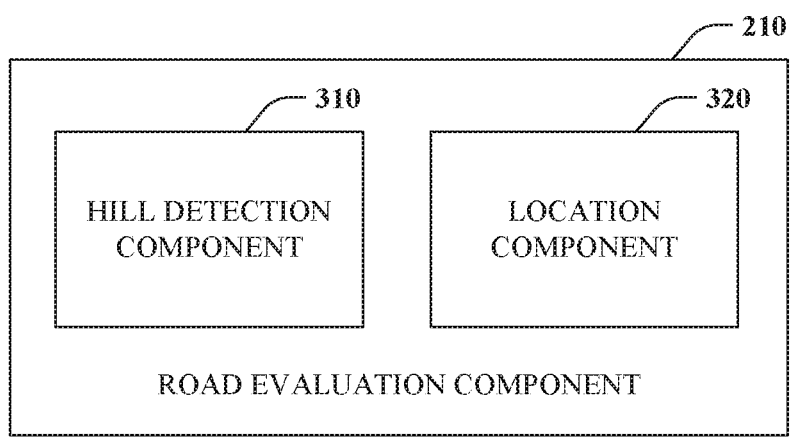
FIG. 3 is a schematic block diagram of a sample road evaluation component.

Turning attention to FIG. 3, the road evaluation component 210 is illustrated in further sample detail. The road evaluation component 210 includes hill detection component 310. The hill detection component 310 analyzes road grade data and seeks to determine the existence of hills in a future road grade. Detection of a hill can correspond to comparing a change in road grade to a predetermined threshold. Further, the change in road can also be compared with a predetermined minimum distance associated with classification as a hill. In one particular implementation, a future uphill section can be considered a hill if predicted vehicle speed loss over that section exceeds a threshold. Similarly, a future downhill section can be considered a hill if predicted vehicle speed gain over that section exceeds a threshold.

Figure 4:
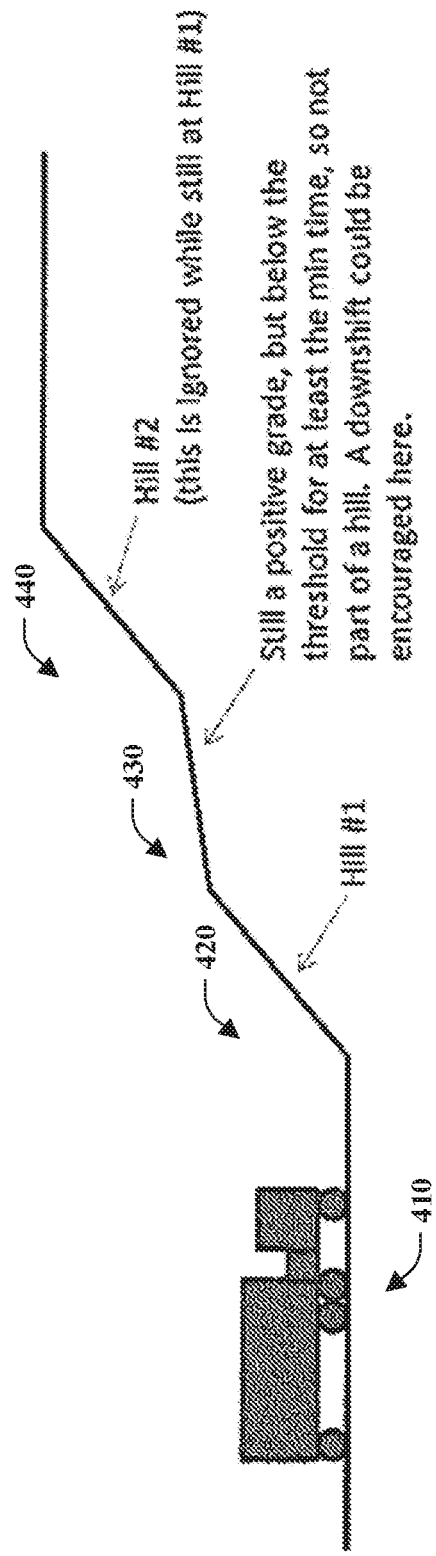
FIG. 4 illustrates a graphical depiction of example road grade change

FIG. 4 illustrates an example future road with positive grade changes. As shown, a vehicle is on a first road portion 410, which is substantially flat. In the future second road portion 420 will be encountered based on the current path of the vehicle. The hill detection component 310 can analyze the grade associated with second road portion 420 and determine that the second road portion 420 is a hill. Third road portion 430 can follow the second road portion 420. Although the third road portion includes a positive grade, the hill detection component 310 can deem that this portion is not a hill because the grade is below a threshold for at least a minimum time. As a result, a downshift could be encouraged here. The fourth road portion 440 can be analyzed by the hill detection component 310 and determined based on the grade to be a hill. However, the fact that the fourth road portion 440 is deemed a hill may not be relevant immediately as the vehicle has not yet reach the first hill associated with the second road portion 420.

Returning briefly to FIG. 3, the road evaluation component 210 further includes location component 320. The location component 320 can interact with the hill detection component 310 to receive, retrieve, or otherwise obtain or acquire identification of hills detected thereby. The location component 320 seeks to determine or classify position of detected hills in a future road grade relative to current vehicle position. For example, a hill can be classified as "far," "looming," "close," "very close," or "top." Classification can be determined based on how many seconds ahead of a vehicle the grade exceeds a threshold for a hill.

Figure 5:
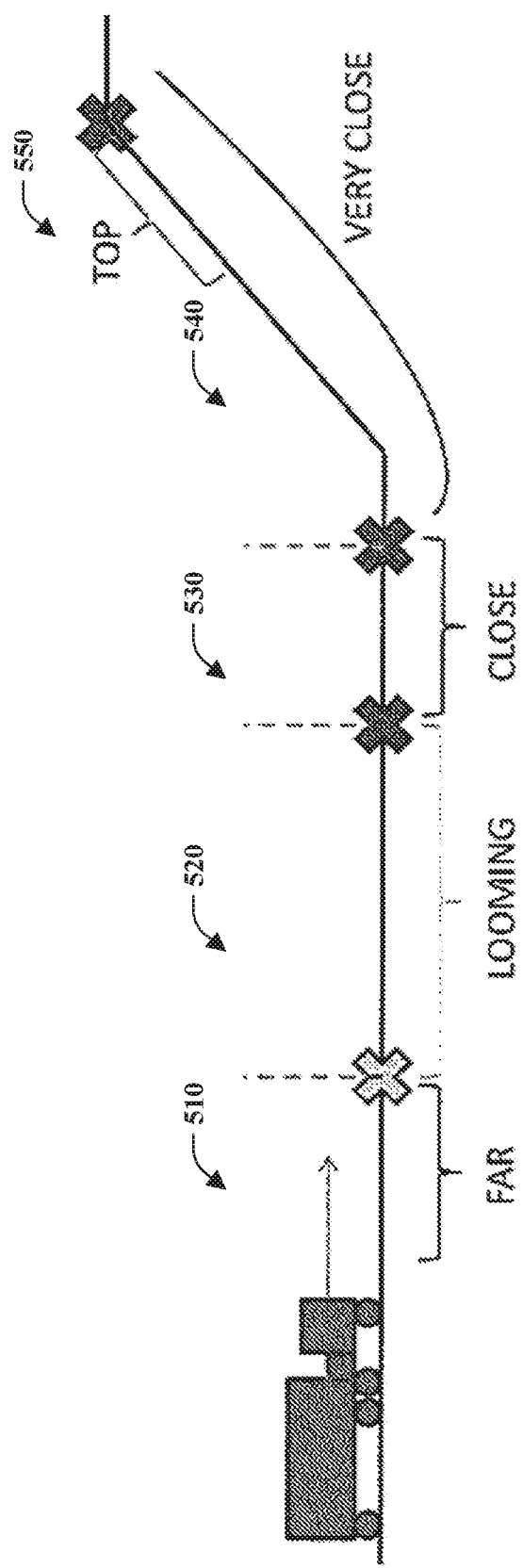
FIG. 5 illustrates a graphical depiction of future road grade classification relative to vehicle position.

Turning to FIG. 5, example location classifications are depicted relative to a future road grade. The position of a hill relative to a current vehicle position can be determined and utilize to classify a hill location. As shown, a classification of "far" at 510 indicates that a hill is far enough away that it should not affect current shift decisions. Gear selection is thus based on normal shift points, or, in other words, a default shift pattern. At 520, the next classification is "looming." When a hill is classified as looming, gear selection can be affected. For example, if speed of a vehicle on a hill is estimated to drop below a minimum threshold in the next gear up, then an upshift can be prevented. Otherwise, gear selection can continue to be based on current demand and grade. At 530, the classification is "close" as it is close to the hill. With this classification if speed is estimated to stay below a minimum threshold for more than a minimum time in a current gear, then a down shift can be triggered. If the speed on the hill is estimated to not stay above the minimum threshold even in the next gear down, then a skip-down is triggered. Unless the vehicle can stay above a minimum speed threshold in the next gear up, then an upshift can be prevented. At 540, the classification is "very close," which include just before the hill and on the hill. In this situation an upshift is prevented. If speed stays above the minimum threshold a downshift is also prevented. If speed continues to drop, a downshift can be triggered. At 550, the classification is "top" for the top of the hill. When near the top of the hill, a downshift can again be prevented even if speed continues to drop.

Returning to FIG. 2, the vehicle status component 220 can be configured to determine a vehicle status on a future road grade section based on whether speed loss or gain relative to a desired cruise speed is within performance bounds. The status of a vehicle's speed relative to cruise control set speed or average speed and high/low thresholds are used to inform shift decisions by the decision component 240. For example, if speed is below a minimum threshold, a downshift can be triggered on a long uphill climb. Further, if speed is above a maximum threshold, a downshift can be triggered on a steep downhill. Various other shift decisions can be made based on points when speed is between minimum and maximum thresholds.

Figure 6:
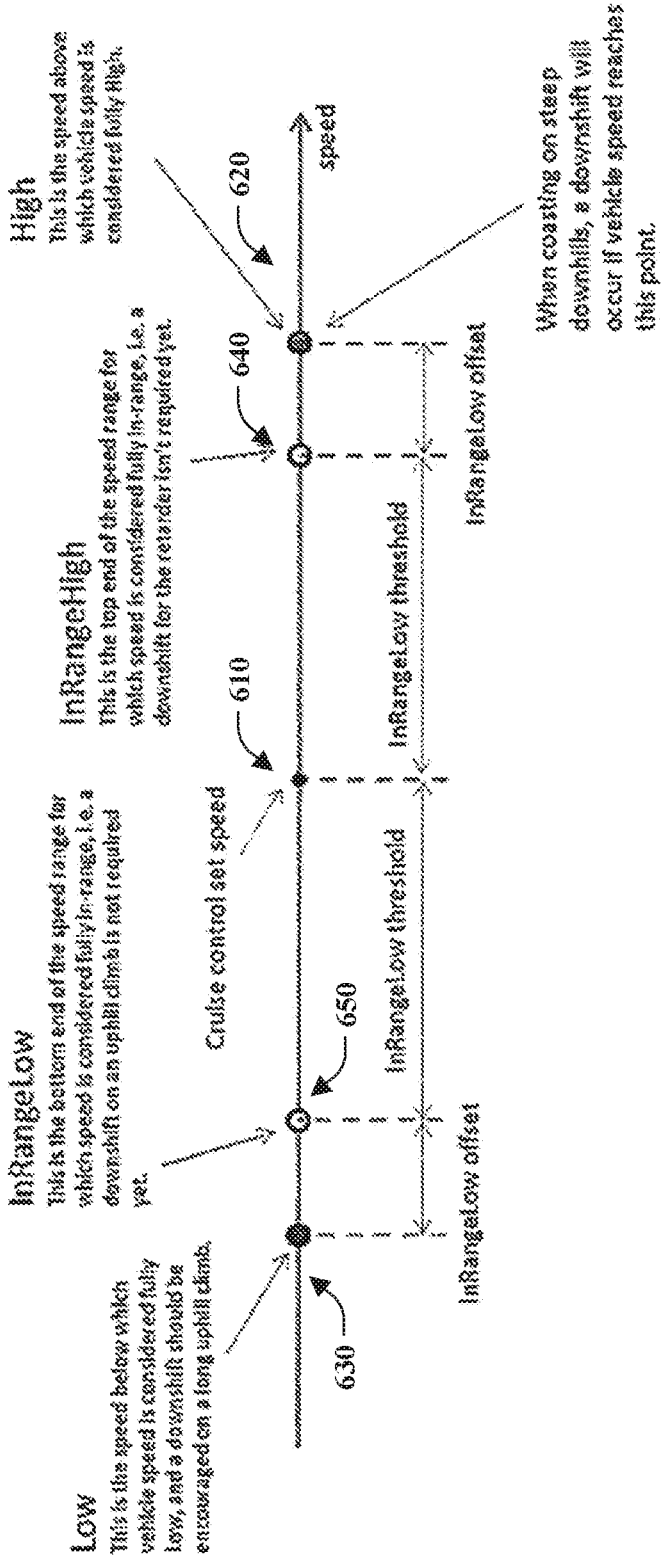
FIG. 6 depicts vehicle status classification.

FIG. 6 depicts vehicle status classification based on speed. The status of a vehicle speed relative to a cruise control set speed and thresholds can be employed to determine shift decisions. At 610, a cruise control set speed is represented in the middle of the line. At 620, a high threshold speed is represented. This speed can be reached on a steep downhill coast. A downshift can be triggered when the vehicle reaches this speed. At 630, a low threshold speed is represented. The speed can be reached on a long uphill climb. A downshift can be triggered when vehicle speed reaches this low threshold speed or lower. At 640, a high in range speed is represented. This speed is the top end speed range for which speed is considered fully in range. As such, a downshift on a downhill is not required yet. At 650, a low in range speed is denoted. This is the bottom end speed range for which speed is considered fully in range. In this case, a downshift on an uphill climb is not yet required at this speed.

Returning briefly to FIG. 2, the dynamic shift system 104 also includes torque demand component 230. The torque demand component 230 determines or classifies engine or retarder torque demand sufficient to maintain vehicle cruise speed on a future road grade. In accordance with one implementation, engine or retarder torque demand can be classified as low, medium, or high using a fuzzy variable with transition zones.

Figure 7:
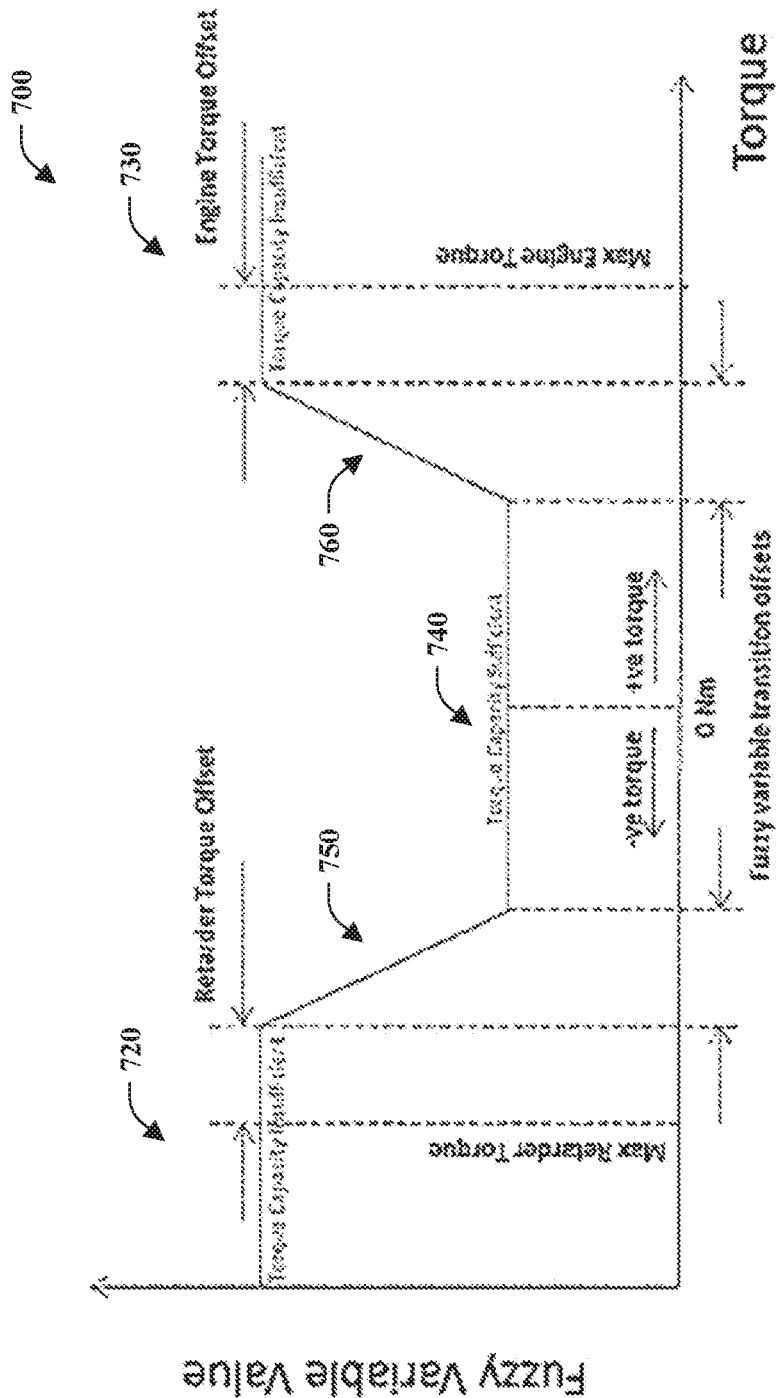
FIG. 7 shows a torque demand graph.

Turning attention to FIG. 7 a torque demand graph 700 is illustrated. Torque is represented on the x-axis and a fuzzy variable value is captured on the y-axis. A determination of sufficiency of engine or retarder torque is accomplished using a fuzzy variable. A fuzzy variable captures a fuzzy concept such as temperature in fuzzy terms like hot, cold, and warm. Here, the fuzzy variable describes sufficiency of torque capacity. Torque capacity associated with retarder is shown as insufficient at 720, and torque capacity with respect to the engine is identified as insufficient at 730. Sufficient torque capacity is captured at 740. Further, there are transition zones at 750 and 760. When the fuzzy variable indicates that torque capacity is insufficient at 720 and 730, normal shift points can be employed. When capacity is sufficient at 740, modified shift points can be used, which are chosen to avoid unnecessary downshifts. In the transition zones at 750 and 760, a combination of normal and modified shift points can be used to avoid sudden changes in shift points. In accordance with one embodiment, torque demand can be classified as low, medium, and high using a fuzzy variable with transitions zones. In the graph 700, low classification can correspond to the portion at 720, high can correspond to the section at 730, and medium can be represented by portion 740.

Returning to FIG. 2, the decision component 240 of the predictive shift system 104 can identify modified shift points as recommendations for implementation by the controller 102 of FIG. 1. The decision component 240 can make use of output from the road evaluation component 210, the vehicle status component 220, and the torque demand component 230. For instance, the decision component 240 can consider the existence, severity, and location of a future road grade, predicted speed of a vehicle on the future road grade, and sufficiency of engine or retarder torque. These and other factors can be employed to trigger or inhibit a gear shift. In one instance, the decision component 240 can trigger a downshift in advance of an uphill section when estimated speed loss on a hill is below a threshold for too long and the vehicle is close to the hill. In another instance, when a vehicle is near the top of a hill, an unnecessary downshift can be prevented. In another scenario, downshift can be triggered on an uphill climb when the speed is determined low with respect to a threshold. In yet another case, a downshift can be performed in anticipation of retarder demand when over speeding down a hill.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. Various aspects of the predictive shift system 104 can employ these mechanisms. For instance, such mechanisms can be employed with respect to classification and prediction. By way of example, and not limitation, a classifier can be utilized to classify a future road grade, classify vehicle status on a future road grade, and classify engine or retarder demand. Further, recommendations can be made regarding gear shifts based on these classifications and/or other data.

In view of the exemplary systems described above, methods that may be implemented in accordance with the disclosed subject matter will be better appreciated with reference to flow chart diagrams of FIGS. 8-11. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 8:
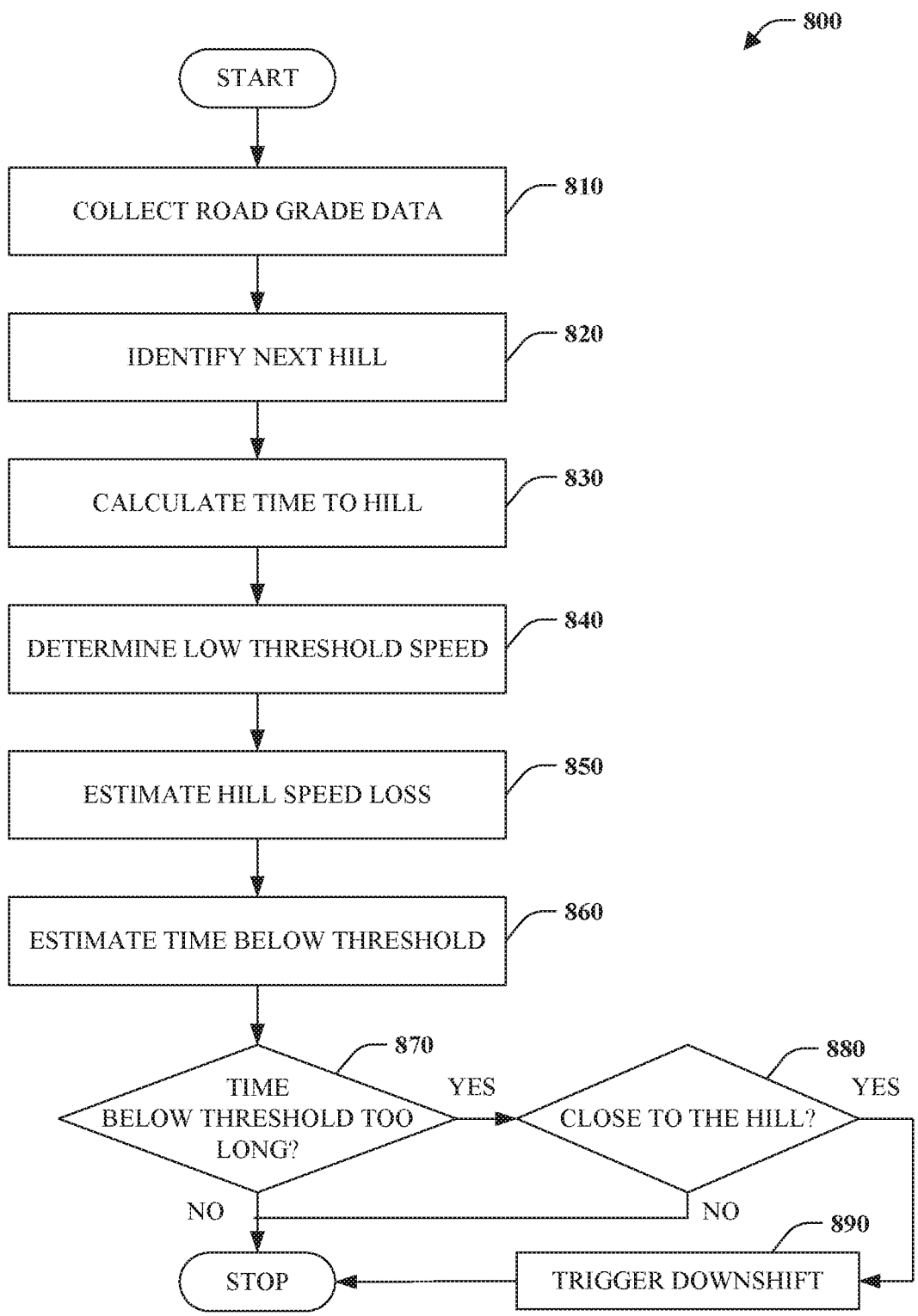
FIG. 8 is a flow chart diagram of a method of triggering a downshift.

FIG. 8 illustrates a method 800 associated with triggering a downshift. The method 800 can be implemented by predictive shift system 104 and components thereof including but not limited to road evaluation component 210, vehicle status component 220, and decision component 240. At reference numeral 810, road grade data is received, retrieved, or otherwise obtained or collected, for example from sensors on the vehicle or network accessible resource, such as an elevation map or the like.

At 820, the next hill is identified. The next hill can correspond to a change in future road grade beyond a threshold along a path of the vehicle. In one instance, road grade data can be analyzed to identify a positive or negative grade. Further, the road grade can be analyzed in terms of effect on vehicle speed as compared to a threshold. For example, a future road section of positive grade can be considered a hill if predicted vehicle speed loss over that section exceeds a threshold. If the predicted speed loss over that section is less than or equal to a threshold, the positive grade would not be deemed a hill. Likewise, a future road section of negative grade can be considered a hill if predicted vehicle speed gain over the section exceeds a threshold.

At 830, the time to the identified hill is calculated, computed, or otherwise determined. In accordance with one embodiment, distance to the start of the hill from the current vehicle position can be determined. Next, time to the hill is computed based on current cruise speed or average speed and the distance.

Low threshold speed is determined at 840. In accordance with one embodiment the low threshold speed can be predetermined, located, and retrieved. In another embodiment, the low speed threshold can be computed based on current speed and gear.

At reference numeral 850, speed loss on the identified hill is estimated or predicted. For example, the speed loss can be determined based on the road grade including slope and distance, current speed, current gear, and characteristics of the vehicle such as engine power, weight of the vehicle, and load, among other things. Speed can be estimated or predicted based on some or all of these and other factors. For example, historical data regarding the vehicle and the same or like hill can be utilized as a basis to predict speed loss. Historical data regarding other like vehicles and the same or like hill can also be utilized as a basis of such a prediction.

At 860, time below the low threshold speed is estimated or predicted. In one embodiment, this time can be computed based on estimated speed loss and the length of the hill. In another embodiment, the time can be predicted based on historical data associated with the vehicle or other vehicles as they drive up the hill.

A determination is made at 870 regarding whether the time below the threshold is too long. In other words, the time below the threshold can be compared with another threshold representing a maximum allowable time below the low threshold speed. If the time below the low speed threshold is not too long ("NO"), the method 800 simply terminates without further action. If the time below the low speed threshold is too long ("YES"), the method 800 proceeds to 880.

At 880, a determination is made as to whether or not the vehicle is currently close to the hill or not. Close to the hill can be a predetermined distance from the vehicle to the start of the hill. If the vehicle is not close to the hill ("NO"), the method 800 can simply terminate. If the vehicle is close to the hill ("YES"), the method 800 continues at 890 where a downshift from a current gear is triggered prior to termination. It should be appreciated that if it can be determined or predicted that speed on the hill will not stay above the speed threshold even in the next gear down, then a skip-down can be triggered to a lower gear.

Figure 9:
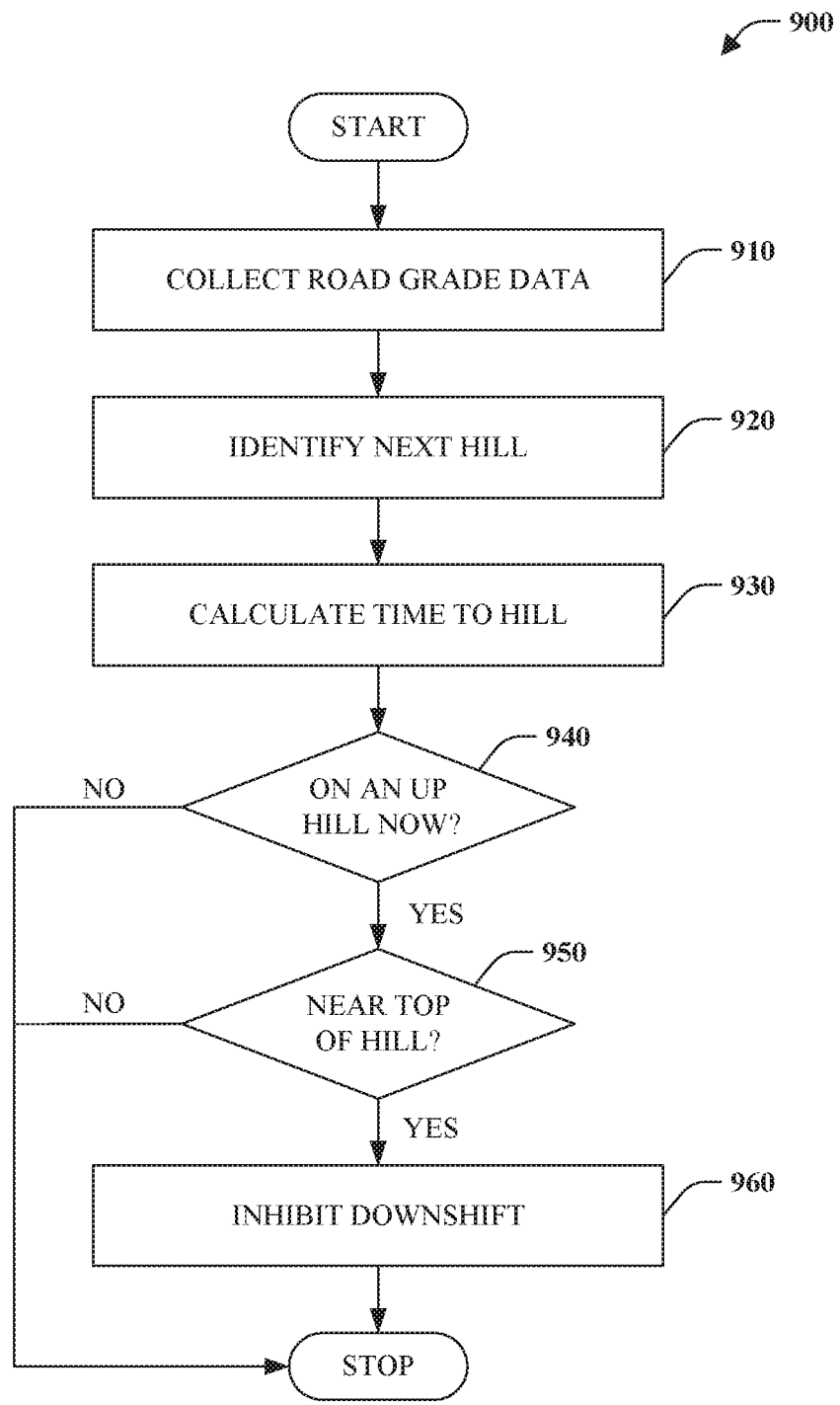
FIG. 9 is a flow chart diagram of a method of inhibiting a downshift.

FIG. 9 depicts a method 900 of inhibiting a downshift. The method 900 can be implemented by predictive shift system 104 and components thereof including but not limited to road evaluation component 210, vehicle status component 220, and decision component 240. At reference numeral 910, road grade data is received, retrieved, or otherwise obtained or collected, for example from sensors on the vehicle or network-accessible resources, such as an elevation map or the like.

At 920, the next hill is identified. The next hill can correspond to a change in future road grade beyond a threshold along a path of the vehicle. In one instance, road grade data can be analyzed to identify a positive or negative grade. Further, the road grade can be analyzed in terms of effect on vehicle speed as compared to a threshold. For example, a future road section of positive grade can be considered a hill if predicted vehicle speed loss over that section exceeds a threshold. If the predicted speed loss over that section is less than or equal to a threshold, the positive grade would not be deemed a hill. Likewise, a future road section of negative grade can be considered a hill if predicted vehicle speed gain over the section exceeds a threshold.

At 930, the time to the identified hill is calculated, computed, or otherwise determined. In accordance with one embodiment, distance to the start of the hill from the current vehicle position can be determined. Next, time to the hill is computed based on current cruise speed or average speed and the distance.

At reference numeral 940, a determination is made as to whether or not the vehicle is on an uphill portion of a hill. In accordance with one embodiment, the determination can be made based on the time to hill and identification of a positive grade. In another instance, the determination can be based on global positioning technology that locates presence of the vehicle on an uphill portion of a hill. If the vehicle is not on an uphill now ("NO"), the method 900 simply terminates. Alternatively, if the vehicle is on an uphill now ("YES"), the method 900 continues at 950.

At 950, a determination is made as to whether or not the vehicle is near the top of a hill. Near the top of the hill can be a predetermined time or distance from the peak of a hill. In one instance such a determination can be based on identification of the hill and time to the hill. In another instance, global positioning technology can be employed to determine whether the vehicle is near the top of the hill. If the vehicle is not near the top of the hill ("NO"), the method 900 simply terminates. On the other hand, if the vehicle is near the top of the hill ("YES"), the method continues at 960 where a downshift is inhibited while the vehicle is near the top of the hill.

Figure 10:
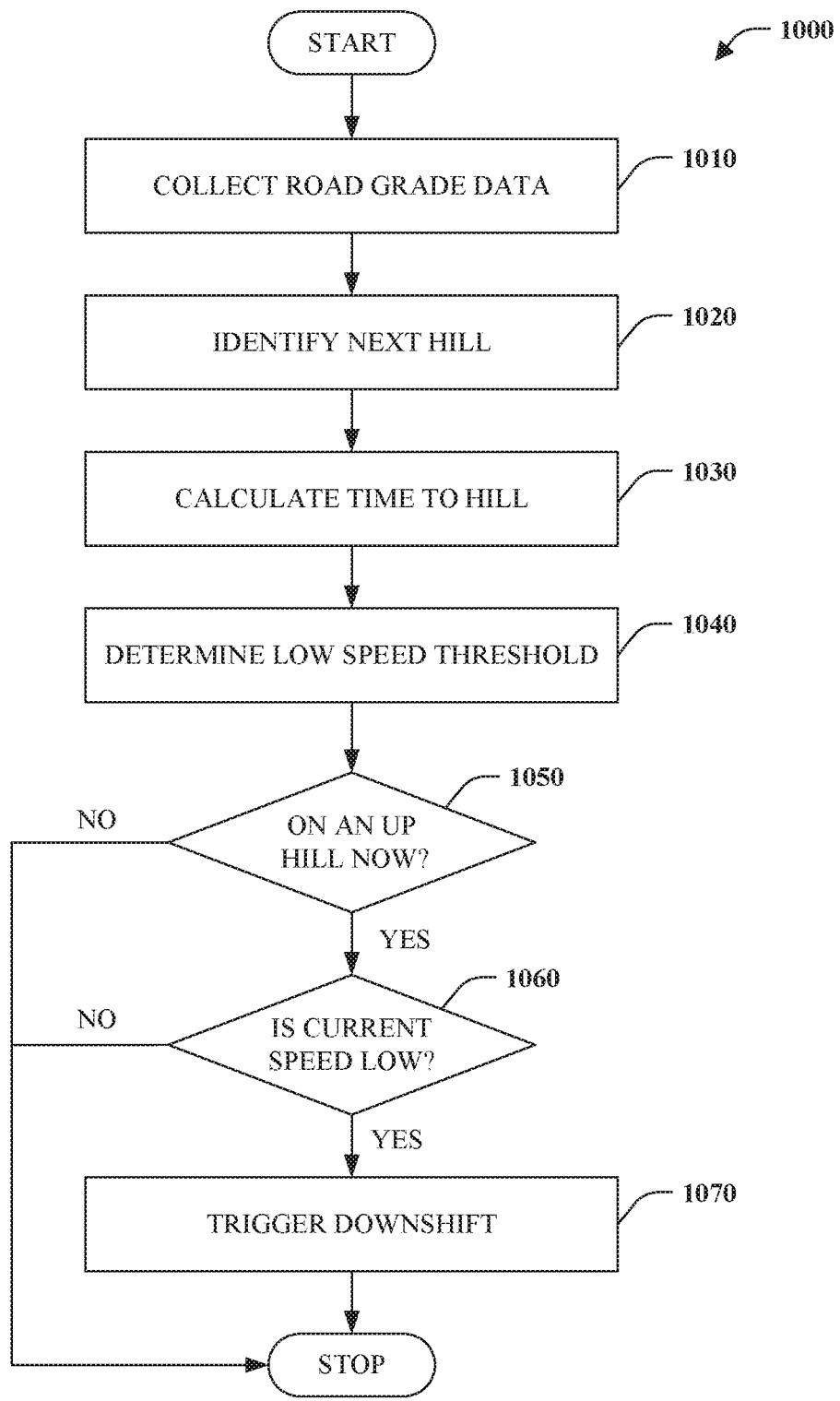
FIG. 10 is a flow chart diagram of a method of triggering a downshift.

FIG. 10 depicts a method 1000 associated with triggering a downshift. The method 1000 can be implemented by predictive shift system 104 and components thereof including but not limited to road evaluation component 210, vehicle status component 220, and decision component 240. At reference numeral 1010, road grade data is received, retrieved, or otherwise obtained or collected, for example from sensors on the vehicle or network-accessible resources, such an elevation map or the like.

A next hill can be identified at 1020. The next hill can correspond to a change in future road grade beyond a threshold along a path of the vehicle. In one instance, road grade data can be analyzed to identify a positive or negative grade. Further, the road grade can be analyzed in terms of effect on vehicle speed as compared to a threshold. For example, a future road section of positive grade can be considered a hill if predicted vehicle speed loss over that section exceeds a threshold. If the predicted speed loss over that section is less than or equal to a threshold, the positive grade would not be deemed a hill. Likewise, a future road section of negative grade can be considered a hill if predicted vehicle speed gain over the section exceeds a threshold.

At 1030, the time to the identified hill is calculated, computed, or otherwise determined. In accordance with one embodiment, distance to the start of the hill from the current vehicle position can be determined. Next, time to the hill is computed based on current cruise speed or average speed and the distance.

Low threshold speed is determined at 1040. In accordance with one embodiment the low threshold speed can be predetermined, located, and retrieved. In another embodiment, the low speed threshold can be computed based on current speed and gear.

At 1050, a determination is made as to whether or not the vehicle is on an uphill portion of a hill presently. Various location technologies can be utilized to determine a current location of a vehicle. That data can be combined with data regarding a hill and a portion of the hill where the vehicle is located. If, at 1050, it is determined that the vehicle is not currently on an uphill portion of a road ("NO"), the method 1000 simply terminates without altering a default shift pattern. If, at 1050, it is determined that the vehicle is on an uphill portion of a road ("YES"), the method continues at 1060.

At 1060, a determination is made as to whether or not current vehicle speed is low. In other words, the determination concerns whether or not the current speed is below the low speed threshold. Vehicle sensors or other external technology can determine the speed of the vehicle. Once speed is known a comparison is made to a low speed threshold to determine whether or not the current speed is low. If the current speed is not low ("NO"), the method 1000 terminates without effect on a default shift pattern. If the current speed is low ("YES"), the method continues to 1070 where a downshift is triggered.

Figure 11:
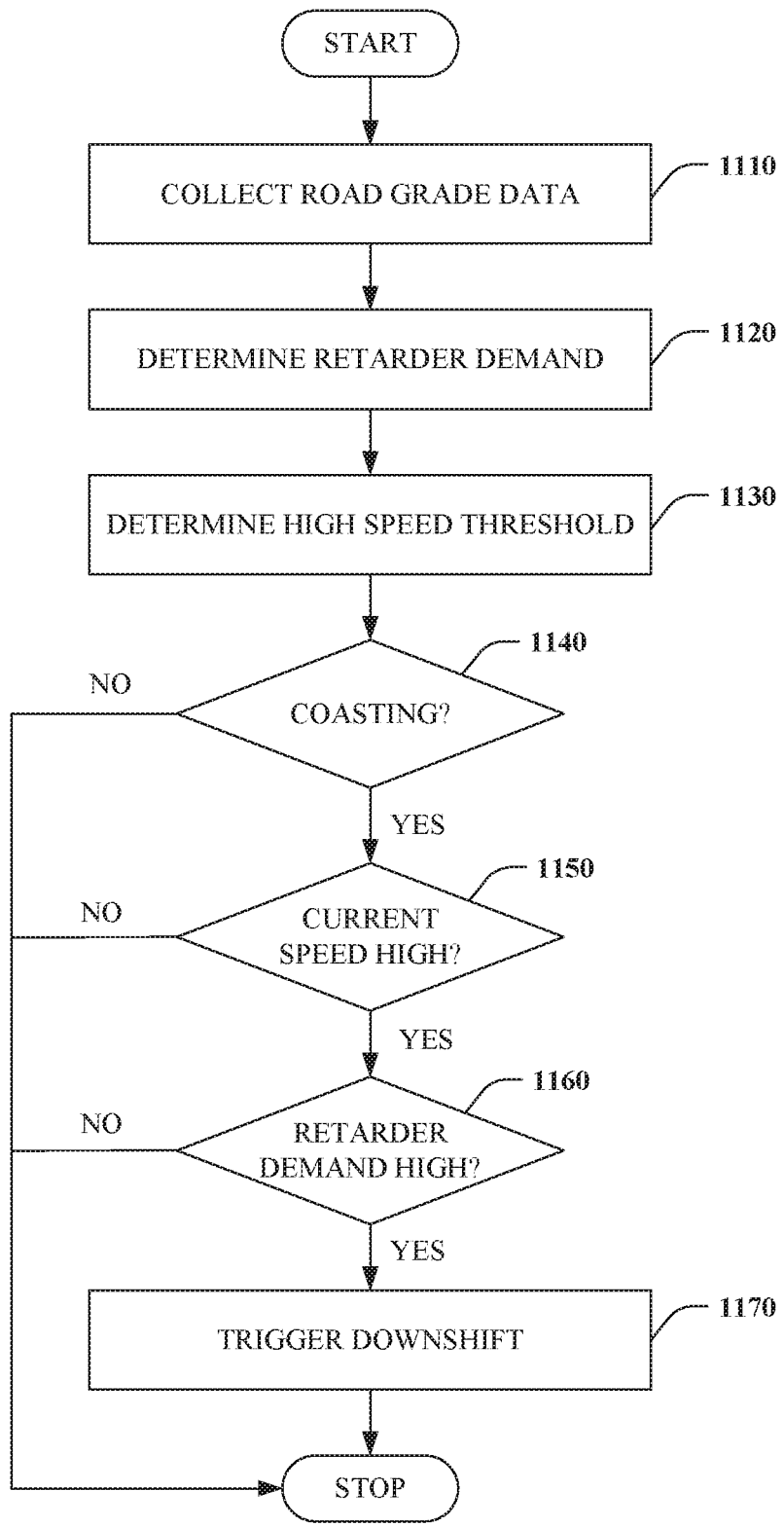
FIG. 11 is a flow chart diagram of a method of triggering a downshift.

FIG. 11 is a flow chart diagram of a method 1100 of triggering a downshift. The method 1100 can be performed by the predictive shift system 104 and components thereof. At reference numeral 1110, road grade data is received, retrieved, or otherwise obtained or collected, for example from sensors on the vehicle or network-accessible resources, such as an elevation map or the like. In this instance, a downhill portion of road grade is assumed.

At 1120, future retarder demand is determined. A retarder is a device that augments or replaces some functions of primary friction-based braking systems to slow or maintain a consistent speed when traveling down a hill or other negative grade. For instance, a retarder can employ pressure created within an engine to lessen the speed of a vehicle. The retarder demand can be determined based on the road grade data including the existence and severity of a downhill portion as well as known or estimated weight of the vehicle and optional load and desired cruise speed. In one instance future retarder demand can be classified as high, low, or medium.

At 1130, a high-speed threshold can be determined. The high-speed threshold can correspond to a speed greater than a cruise control set speed or average speed. The high-speed threshold can be determined based on a predetermined value, computed based on a variety of predetermined and current values, such as vehicle and sensor status, or provided by another device. For example, the high-speed threshold can correspond to the sum of the set or average speed and the tolerance. The high-speed threshold can be predetermined and simply retrieved. Alternatively, the high-speed threshold can be computed in near real time. A low-speed threshold could also be computed in a similar manner as the high-speed threshold. Taken together the low-speed threshold and the high-speed threshold comprise a range of threshold values or tolerance.

At numeral 1140, a determination is made as to whether or not the vehicle is currently coasting. A vehicle is coasting when it is not being propelled by an engine but continues to move, such as when the vehicle is propelled by gravity down a hill. Various sensors and data therefrom can be analyzed to determine whether the engine is the prime mover of the vehicle or not. This can be determined by comparing the current speed of the vehicle versus expected speed based on engine and transmission parameters (e.g., current gear, revolutions per minute, . . . ). In one instance, the vehicle can be set to maintain particular speed by a cruise control system. Here, if the current speed is greater than the cruise control speed, the vehicle can be deemed to be coasting. If the vehicle is not coasting ("NO"), the method 1100 can terminate without impact on transmission gear selection. If the vehicle is coasting ("YES"), the method 1100 continues at 1150.

At reference 1150, a determination is made as to whether or not the current vehicle speed is high. A vehicle speed can be deemed high based on a comparison with the high-speed threshold. More specifically, if the current vehicle speed is greater than the high-speed threshold, the current speed can be deemed high or otherwise not high. If, at 1150, it is determined that the speed is not high ("NO"), the method 1100 can terminate without any impact on transmission gear selection. Alternatively, if the current speed is deemed high ("YES"), the method 1100 can continue at 1160.

At 1160, a determination is made as to whether or not future retarder demand will be high. The future retarder demand is determined at 1120. To reiterate, given the current vehicle speed and position on a hill, among additional or alternate factors, an estimate or prediction can be made regarding retarder demand including a classification of high, medium, or low demand, for example. In one instance, the future retarder demand can be compared to the threshold determined at 1130. Regardless of implementation, the determination concerns whether or not the future retarder demand is deemed high. If the future retarder demand is not high ("NO"), the method 1100 can simply terminate. If the future retarder demand is high ("YES"), the method proceeds to 1170 where a downshift is triggered.

Aspects of the subject disclosure concern a transmission and automatic or automated shifting of gears of the transmission. Default shift patterns can be less than optimal in terms of drivability and fuel economy when confronting changes in road grade including existence of hills. Gear shifting is enhanced using a predictive shift system and method. Future road grade data can be analyzed to determine or infer the existence and severity of a future hill in the path of the vehicle. Estimates or predictions can be made regarding future vehicle speed, time at different points of a hill, and retarder demand, among other things, to inform a decision regarding gear shifting, including triggering or inhibiting shifts.

The subject disclosure provides for various products and processes that are configured to enhance transmission gear shifting in view of changes in road grade and various functionality related thereto. What follows are one or more example systems and methods.

In one general aspect, a system comprises a processor coupled to a memory that includes instructions that when executed by the processor cause the processor to: identify a future change in road grade based on road grade data and vehicle path; predict a change in speed relative to a vehicle cruise speed that is outside a performance bound based on the change in road grade and current gear; determine a shift recommendation to maintain vehicle cruise speed within the performance bound; and communicate the shift recommendation to a controller that modifies a shift pattern of a transmission based on the shift recommendation. Instructions can further cause the processor to identify a hill based on the road grade and predicting the change of speed in view of the hill. The system further comprises instructions that cause the processor to identify existence of the hill when predicted vehicle speed loss exceeds a predetermined threshold. Instructions can further cause the processor to classify current vehicle position related to the hill and determine the shift recommendation based on current vehicle position, and determine as the shift recommendation to inhibit an upshift, when speed on the hill is estimated to drop below a minimum threshold in the next gear up in advance of an uphill section. The system further comprises instructions that cause the processor to determine as a shift recommendation to trigger downshift as the vehicle nears the hill, when speed is estimated to stay below a minimum threshold for more than a predetermined minimum time in the current gear. The instructions can further cause the processor to determine as the shift recommendation to inhibit a downshift when the vehicle is on the hill and the vehicle maintains a speed above a minimum threshold. The system further comprises instructions that cause the processor to determine as the shift recommendation to trigger a downshift when the vehicle is on the hill and the vehicle speed falls below a minimum threshold. The instructions can also cause the processor to determine as the shift recommendation to inhibit a downshift when the vehicle nears the top of the hill.

In one general aspect, a method comprises: identifying a future change in road grade based on road grade data and path of a vehicle; predicting a change in speed relative to vehicle cruise speed that is outside a performance bound based on the change in road grade and current gear; determining a shift recommendation to maintain vehicle cruise speed within the performance bound; and communicating the shift recommendation to a controller that modifies gear selection of a transmission based on the shift recommendation. The method further comprises identifying a hill based on the road grade data when the change of speed exceeds a predetermine threshold. The method further comprises classifying position of the vehicle relative to the hill and determining the shift recommendation based on the position. The method further comprises determining the shift recommendation to be to inhibit a downshift near the top of the hill. The method further comprises determining the shift recommendation to be to trigger a downshift in advance of an uphill section in which speed is predicted to fall below a minimum speed for a time that exceeds a threshold time.

In one general aspect, a method comprises executing, on a processor, instructions that cause the processor to perform operations comprising: identifying existence and severity of a hill based on future road grade data and a vehicle path; predicting a change in speed associated with the hill relative to a desired cruise speed that is outside a performance threshold; determining a shift recommendation to maintain cruise speed within the performance threshold; and modifying a default shift pattern of a transmission based on the shift recommendation. The operations further comprise determining the shift recommendation based on current position of the vehicle relative to the hill. The operations further comprise determining the shift recommendation to be to trigger a downshift in advance of an uphill section in which speed is estimated to fall below a minimum speed for a time that exceeds a threshold time. Further, the operations comprise determining the shift recommendation to be to inhibit a downshift near top of the hill. The operations further comprise determining the shift recommendation to be to downshift from a current gear on an uphill portion of the hill when speed drops below a minimum threshold speed. Further, the operations comprise determining the shift recommendation to be to downshift from a current gear in anticipation of exceeding a maximum speed on a downhill portion of the hill.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'"" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 12:
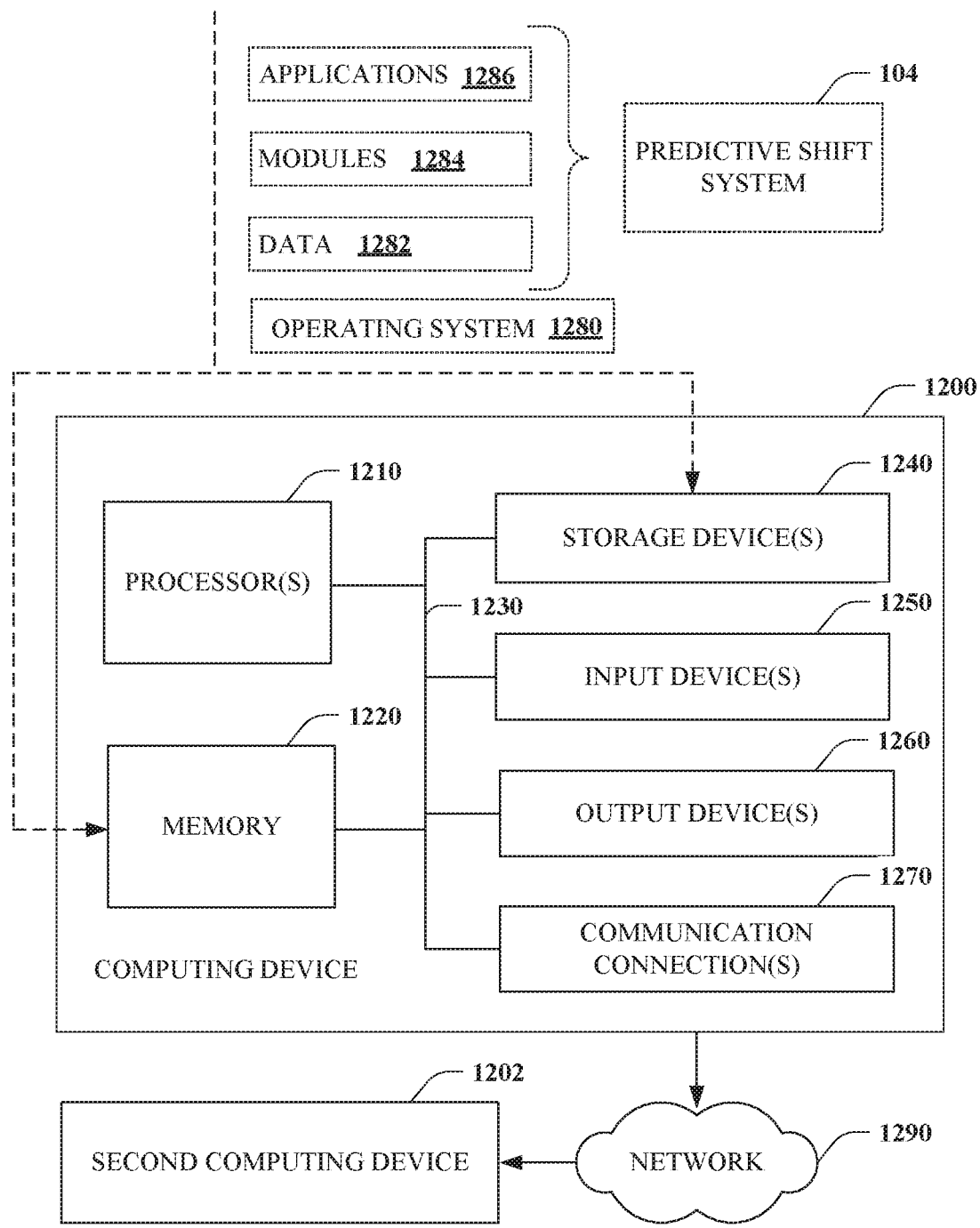
FIG. 12 is a schematic block diagram illustrating a suitable operating environment for aspects of the subject disclosure.

To provide a context for the disclosed subject matter, FIG. 12 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 12, illustrated is an example computing device 1200 (e.g., desktop, laptop, tablet, watch, server, hand-held, programmable consumer or industrial electronics, set-top box, game system, compute node . . . ). The computing device 1200 includes one or more processor(s) 1210, memory 1220, system bus 1230, storage device(s) 1240, input device(s) 1250, output device(s) 1260, and communications connection(s) 1270. The system bus 1230 communicatively couples at least the above system constituents. However, the computing device 1200, in its simplest form, can include one or more processors 1210 coupled to memory 1220, wherein the one or more processors 1210 execute various computer executable actions, instructions, and or components stored in the memory 1220.

The processor(s) 1210 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1210 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1210 can be a graphics processor unit (GPU) that performs calculations with respect to digital image processing and computer graphics.

The computing device 1200 can include or otherwise interact with a variety of computer-readable media to facilitate control of the computing device to implement one or more aspects of the disclosed subject matter. The computer-readable media can be any available media that is accessible to the computing device 1200 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 1200. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 1220 and storage device(s) 1240 are examples of computer-readable storage media. Depending on the configuration and type of computing device, the memory 1220 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 1200, such as during start-up, can be stored in nonvolatile memory, while volatile memory can act as external cache memory to facilitate processing by the processor(s) 1210, among other things.

The storage device(s) 1240 include removable/non-removable, volatile/non-volatile storage media for storage of vast amounts of data relative to the memory 1220. For example, storage device(s) 1240 include, but are not limited to, one or more devices such as a magnetic or optical disk drive, floppy disk drive, flash memory, solid-state drive, or memory stick.

Memory 1220 and storage device(s) 1240 can include, or have stored therein, operating system 1280, one or more applications 1286, one or more program modules 1284, and data 1282. The operating system 1280 acts to control and allocate resources of the computing device 1200. Applications 1286 include one or both of system and application software and can exploit management of resources by the operating system 1280 through program modules 1284 and data 1282 stored in the memory 1220 and/or storage device(s) 1240 to perform one or more actions. Accordingly, applications 1286 can turn a general-purpose computer 1200 into a specialized machine in accordance with the logic provided thereby.

All or portions of the disclosed subject matter can be implemented using standard programming and/or engineering techniques to produce software, firmware, hardware, or any combination thereof to control the computing device 1200 to realize the disclosed functionality. By way of example and not limitation, all or portions of the predictive shift system 104 can be, or form part of, the application 1286, and include one or more modules 1284 and data 1282 stored in memory and/or storage device(s) 1240 whose functionality can be realized when executed by one or more processor(s) 1210.

In accordance with one particular embodiment, the processor(s) 1210 can correspond to a system on a chip (SOC) or like architecture including, or in other words integrating, both hardware and software on a single integrated circuit substrate. Here, the processor(s) 1210 can include one or more processors as well as memory at least similar to the processor(s) 1210 and memory 1220, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the predictive shift system 104 and/or functionality associated therewith can be embedded within hardware in an SOC architecture.

The input device(s) 1250 and output device(s) 1260 can be communicatively coupled to the computing device 1200. By way of example, the input device(s) 1250 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 1260, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1250 and output device(s) 1260 can be connected to the computing device 1200 by way of wired connection (e.g., bus), wireless connection (e.g., Wi-Fi, Bluetooth . . . ), or a combination thereof.

The computing device 1200 can also include communication connection(s) 1270 to enable communication with at least a second computing device 1202 by means of a network 1290. The communication connection(s) 1270 can include wired or wireless communication mechanisms to support network communication. The network 1290 can correspond to a local area network (LAN) or a wide area network (WAN) such as the Internet. The second computing device 1202 can be another processor-based device with which the computing device 1200 can interact. For example, the computing device 1200 can form part of a transmission controller and the second computing device can provide a service associated with road grade and vehicle data.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
    a processor coupled to a memory that includes instructions that when executed by the processor cause the processor to:
        identify a future change in road grade based on road grade data and vehicle path;
        predict a change in speed relative to a vehicle cruise speed that is outside a performance threshold based on the future change in road grade;
        determine a shift recommendation to maintain vehicle cruise speed within the performance threshold;
            wherein the shift recommendation is based on a multiple of identified future changes in road grade and application of a fuzzy variable logic that modifies shift points for controlling a retarder based on a torque capacity of the vehicle; and
        communicate the shift recommendation to a controller that alters gear selection of a transmission based on the shift recommendation.

2. The system of claim 1, further comprising instructions that cause the processor to identify a hill based on the road grade data and predicted change in vehicle speed in view of the hill.

3. The system of claim 2, further comprising instructions that cause the processor to identify existence of the hill when vehicle speed loss exceeds a predetermined threshold.

4. The system of claim 2, further comprising instructions that cause the processor to classify current vehicle position related to the hill and determine the shift recommendation based on the current vehicle position.

5. The system of claim 4, wherein the shift recommendation is to inhibit an upshift, when speed on the hill is estimated to drop below a minimum threshold in a next gear up in advance of an uphill section.

6. The system of claim 4, wherein the shift recommendation is to trigger downshift, when speed is estimated to stay below a minimum threshold for more than a predetermined minimum time in a current gear as the vehicle nears the hill.

7. The system of claim 4, wherein the shift recommendation is to inhibit a downshift when the vehicle is on the hill and the vehicle maintains a speed above a minimum threshold.

8. The system of claim 4, wherein the shift recommendation is to trigger a downshift when the vehicle is on the hill and vehicle speed falls below a minimum threshold.

9. The system of claim 4, wherein the shift recommendation is to inhibit a downshift when the vehicle nears a top of the hill.

10. A method, comprising:
    identifying a future change in road grade based on road grade data and path of a vehicle;
    predicting a change in speed relative to vehicle cruise speed that is outside a performance threshold based on the change in road grade;
    determining a shift recommendation to maintain vehicle cruise speed within the performance threshold;
        wherein the shift recommendation is based on a multiple of identified future changes in road grade and application of a fuzzy variable logic that modifies shift points for controlling a retarder based on a torque capacity of the vehicle; and communicating the shift recommendation to a controller that modifies default gear selection of a transmission based on the shift recommendation.

11. The method of claim 10, further comprising identifying a hill based on the road grade data when the change in speed exceeds a predetermined threshold.

12. The method of claim 11, further comprising classifying position of the vehicle relative to the hill and determining the shift recommendation based on the position.

13. The method of claim 12, further comprising determining the shift recommendation to be to inhibit a downshift near top of the hill.

14. The method of claim 12, further comprising determining the shift recommendation to be to trigger a downshift in advance of an uphill section in which speed is predicted to fall below a minimum speed for a time that exceeds a threshold time.

15. A method, comprising:
executing, on a processor, instructions that cause the processor to perform operations comprising:
identifying existence and severity of a hill based on future road grade data and a vehicle path;
predicting a change in speed associated with the hill relative to a desired cruise speed that is outside a performance threshold and current gear;
determining a shift recommendation to maintain cruise speed within the performance threshold;
wherein the shift recommendation is based on a multiple of identified future changes in road grade and application of a fuzzy variable logic that modifies shift points for controlling a retarder based on a torque capacity of the vehicle; and
modifying a default shift pattern of a transmission based on the shift recommendation.

16. The method of claim 15, wherein the operations further comprise determining the shift recommendation based on current position of the vehicle relative to the hill.

17. The method of claim 16, wherein the operations further comprise determining the shift recommendation to be a downshift in advance of an uphill section in which speed is estimated to fall below a minimum speed for a time that exceeds a threshold time.

18. The method of claim 16, wherein the operations further comprise determining the shift recommendation to be to inhibit a downshift near top of the hill.

19. The method of claim 16, wherein the operations further comprise determining the shift recommendation to be a downshift from the current gear on an uphill portion of the hill when speed drops below a minimum threshold speed.

20. The method of claim 16, wherein the operations further comprise determining the shift recommendation to be a downshift from the current gear in anticipation of exceeding a maximum speed on a downhill portion of the hill.

* * * * *